(12) United States Patent
Motto

(10) Patent No.: US 12,423,450 B2
(45) Date of Patent: Sep. 23, 2025

(54) DATA BROKER

(71) Applicant: Early Warning Services, LLC, Scottsdale, AZ (US)

(72) Inventor: Andrea Motto, San Francisco, CA (US)

(73) Assignee: Early Warning Services, LLC, Scottsdale, AZ (US)

( * ) Notice: Subject to any disclaimer, the term of this patent is extended or adjusted under 35 U.S.C. 154(b) by 359 days.

(21) Appl. No.: 18/095,799

(22) Filed: Jan. 11, 2023

(65) Prior Publication Data

US 2023/0237172 A1    Jul. 27, 2023

Related U.S. Application Data

(60) Provisional application No. 63/298,851, filed on Jan. 12, 2022.

(51) Int. Cl.
*G06F 21/60* (2013.01)
*G06Q 20/06* (2012.01)

(52) U.S. Cl.
CPC .......... *G06F 21/604* (2013.01); *G06Q 20/06* (2013.01); *G06F 2221/2117* (2013.01); *G06F 2221/2141* (2013.01); *G06Q 2220/12* (2013.01)

(58) Field of Classification Search
CPC .... G06F 21/604; G06F 21/32; G06F 21/6245; G06F 21/6218; G06F 21/31
See application file for complete search history.

(56) References Cited

U.S. PATENT DOCUMENTS

| | | | |
|---|---|---|---|
| 8,881,257 B2 * | 11/2014 | Cha | H04L 63/0807 726/10 |
| 11,061,929 B2 * | 7/2021 | Xu | G06F 9/547 |
| 11,184,766 B1 * | 11/2021 | Lord | G06V 10/75 |
| 11,409,898 B1 * | 8/2022 | Jensen | H04L 63/0869 |
| 12,001,394 B1 * | 6/2024 | Gassner | G06F 21/6227 |

(Continued)

OTHER PUBLICATIONS

A. Grüner, A. Mühle and C. Meinel, "ATIB: Design and Evaluation of an Architecture for Brokered Self-Sovereign Identity Integration and Trust-Enhancing Attribute Aggregation for Service Provider," in IEEE Access, vol. 9, pp. 138553-138570, 2021. (Year: 2021).*

(Continued)

*Primary Examiner* — Kari L Schmidt
(74) *Attorney, Agent, or Firm* — Kilpatrick Townsend & Stockton LLP

(57) ABSTRACT

A method, performable by a data broker, of securely transferring data without passwords may include registering an entity using a FIDO authentication process. The method may include associating, based on a receipt of first access token generated by a data provider using a first OIDC authorization process, the data provider with the entity. The method may include generating a second access token, using a second OIDC authorization process, associated with a data recipient. The method may include receiving a request to transfer requested data from the data provider to the data recipient. The request may include the second access token. The method may include transmitting the first long-lived token to the data provider for receiving the requested data. The method may include transmitting the requested data to the data recipient.

20 Claims, 10 Drawing Sheets

(56) References Cited

U.S. PATENT DOCUMENTS

| | | | | |
|---|---|---|---|---|
| 2010/0250955 | A1* | 9/2010 | Trevithick | G06F 21/31 |
| | | | | 713/185 |
| 2013/0125226 | A1* | 5/2013 | Shah | H04W 12/0431 |
| | | | | 726/7 |
| 2014/0173752 | A1* | 6/2014 | Boelter | H04L 67/568 |
| | | | | 726/28 |
| 2019/0217190 | A1* | 7/2019 | Shitara | A63F 13/79 |
| 2019/0333054 | A1* | 10/2019 | Cona | H04L 9/3297 |
| 2020/0274900 | A1* | 8/2020 | Vaishnavi | H04L 63/20 |
| 2021/0218742 | A1* | 7/2021 | Cook | G06F 21/31 |
| 2022/0060514 | A1* | 2/2022 | Hu | H04L 63/061 |
| 2023/0091318 | A1* | 3/2023 | Lindemann | H04L 63/0861 |
| | | | | 726/4 |
| 2023/0128813 | A1* | 4/2023 | Babani | G06F 21/6245 |
| | | | | 726/4 |
| 2024/0362349 | A1* | 10/2024 | Babani | G06F 21/6218 |

OTHER PUBLICATIONS

B. O. Kose, O. Buk, H. A. Mantar and V. Coskun, "TrustedID: An Identity Management System based on OpenID Connect Protocol," 2020 4th International Symposium on Multidisciplinary Studies and Innovative Technologies (ISMSIT), Istanbul, Turkey, 2020, pp. 1-6. (Year: 2020).*

K. Papadamou et al., "Killing the Password and Preserving Privacy With Device-Centric and Attribute-Based Authentication," in IEEE Transactions on Information Forensics and Security, vol. 15, pp. 2183-2193, 2020. (Year: 2020).*

* cited by examiner

DATA BROKER

CROSS REFERENCE

This application claims benefit of U.S. Provisional Application No. 63/298,851 by MOTTO, entitled "DATA BROKER," filed Jan. 12, 2022, the disclosure of which is incorporated by reference herein in its entirety.

BACKGROUND

Historically, data transfer has involved password-based authentications and historical data transfer systems that may mismanage data. For example, a first entity (e.g., a consumer, a provider of goods or services, etc.) may desire to transfer data to a second entity (e.g., a consumer, a provider of goods or services, etc.). The first entity may be required to provide authentication information, for example username and password combinations, to the historical data transfer systems prior to a data transfer taking place. Additionally, the historical data transfer systems may take ownership of the transferred data or may otherwise mismanage the data (e.g., selling a subset of the transferred data to an uninvolved entity, etc.). Accordingly, the transferred data may not be secure against unwanted disclosure, and initiating the data transfer may be inefficient due to the historical authentication requirements. Thus, there is a need for a data transfer system with improved authentication and data transfer protocols.

BRIEF SUMMARY OF THE INVENTION

Embodiments of the present invention may provide a framework for secure and efficient data transfer between entities. Embodiments may include a data broker that facilitates the transfer of data between two or more entities (e.g., a data provider and a data recipient) using passwordless authentication (e.g., fast identity online ("FIDO") authentication) and without assuming possession of the transferred data (e.g., using one or more OpenID Connect ("OIDC") authorization processes). For example, the data broker may facilitate a set of transactions involving different access tokens and entity permissions. The set of transactions may involve receiving permission to send and/or receive data with respect to a data provider and a data recipient. The data broker can combine various authentication and/or authorization standards for providing passwordless and secure data transfer to the two or more entities.

One aspect of the disclosure provides for a method of securely transferring data without passwords, the method comprising, using a data broker, registering an entity using a FIDO authentication process, associating, based on a receipt of a first access token generated by a data provider, the data provider with the entity, generating a second access token, using a first OIDC authorization process, associated with a data recipient, receiving a request to transfer requested data from the data provider to the data recipient, wherein the request includes the second access token, transmitting the first access token to the data provider for receiving the requested data from the data provider, and transmitting the requested data to the data recipient. The first access token may be generated by the data provider via a second OIDC authorization process. The second OIDC authorization process may involve the data provider receiving a first consent, from the entity, to data disclose data from the data provider, the first OIDC authorization process may involve the data broker receiving a second consent, from the entity, to disclose data from the data broker, and the first consent and the second consent are distinct. The first OIDC authorization process and the second OIDC authorization process may include one or more FIDO2 authentication processes. The first access token and the second access token may be different. The method may further comprise receiving a payment token from the data provider, the payment token usable for processing payment on behalf of the entity. Transmitting the requested data to the data recipient may include transmitting the payment token to the data recipient. Receiving the request to transfer data may include providing a set of selectable categories of data to the entity. Receiving the request to transfer data may include receiving an indication that at least one category of data of the selectable categories of data was selected by the entity. The method may further comprise receiving the requested data from the data provider in response to transmitting the first access token.

Another aspect of the disclosure provides for a system for sharing digital identity data, comprising one or more processors, and a memory having stored thereon instructions that, upon execution by the one or more processors, cause the one or more processors to register an entity using a FIDO authentication process, associate, based on a receipt of a first access token generated by a data provider, the data provider with the entity, generate a second access token, using a first OIDC authorization process, associated with a data recipient, receive a request to transfer requested data from the data provider to the data recipient, wherein the request includes the second access token, transmit the first access token to the data provider for receiving the requested data from the data provider, and transmit the requested data to the data recipient. The first access token may be generated by the data provider via a second OIDC authorization process. The second OIDC authorization process may involve the data provider receiving a first consent, from the entity, to data disclose data from the data provider, the first OIDC authorization process may involve the data broker receiving a second consent, from the entity, to disclose data from the data broker, and the first consent and the second consent may be distinct. The first OIDC authorization process and the second OIDC authorization process may include one or more FIDO2 authentication processes. The first access token and the second access token may be different. The method may further comprise receiving a payment token from the data provider, the payment token usable for processing payment on behalf of the entity. Transmitting the requested data to the data recipient may include transmitting the payment token to the data recipient. Receiving the request to transfer data may include providing a set of selectable categories of data to the entity. Receiving the request to transfer data may include receiving an indication that at least one category of data of the selectable categories of data was selected by the entity. The method may further comprise receiving the requested data from the data provider in response to transmitting the first access token.

DETAILED DESCRIPTION OF THE INVENTION

Embodiments of the present invention are directed to techniques for facilitating passwordless and secure transfer of data between a data provider and a data recipient on behalf of an entity and using different access tokens. The entity can include an individual, for example a consumer and/or a user, or any other suitable entity that can submit a request for data transfer through a user device. The data provider can include a first financial institution, a first government institution, a first healthcare provider, and/or other suitable entity that can provide data on behalf of the entity. The data recipient can include a second financial institution, a second government institution, a second healthcare provider, and/or other suitable entity that can receive data relating to the entity. The data can include personally identifiable information or protected personal information such as name, address, date of birth, financial account information, other suitable account information, other suitable data, and/or any suitable combination thereof. The data may be transferred (e.g., by the data broker) in response to receiving one or more access tokens (e.g., which may be generated in response to receiving consent from the entity and relating to the data transfer). Embodiments may include the data broker transferring the data without assuming possession of the data or otherwise without performing any non-consented data disclosures.

Figure 4B:
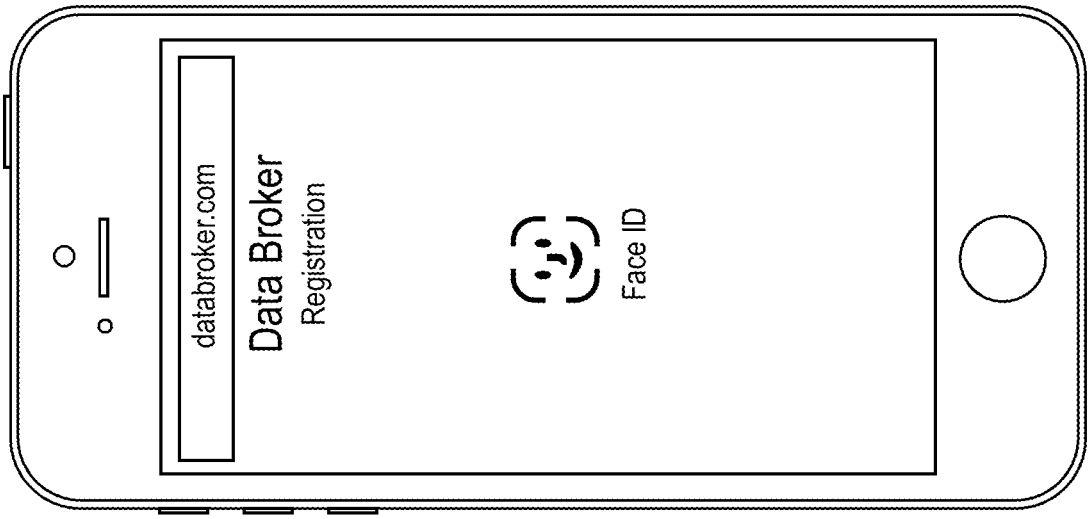
FIGS. 4A-4J depict one or more methods of the disclosure performed on a user device according to an embodiment of the present invention.
Figure 4A:
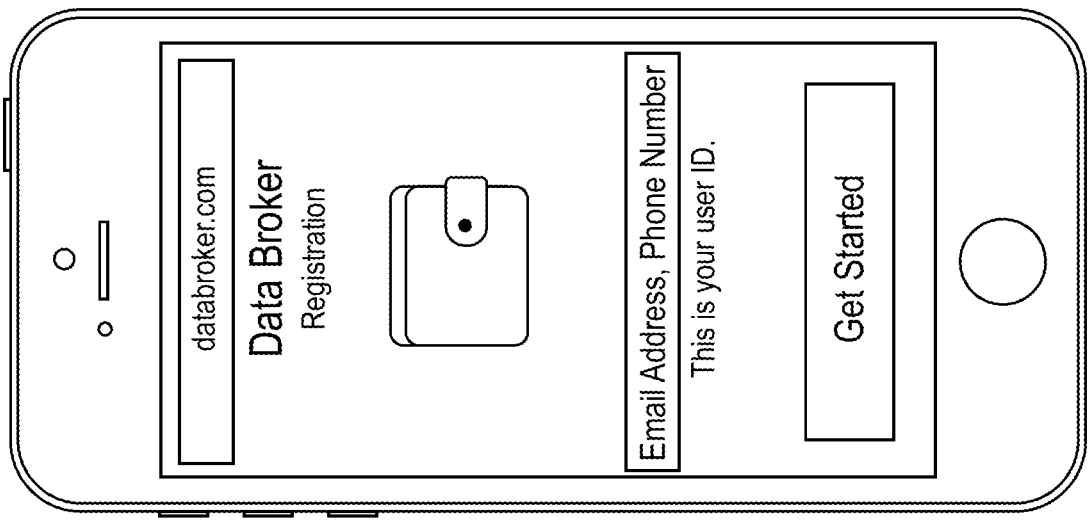

Embodiments may include a data broker that can be used to facilitate data transfer on behalf of a user and between a data provider and a data recipient. FIGS. 4A-4J depict at least a portion of the method as described below performed on a user device. Although the methods are depicted as being performed on a website, in other embodiments, the methods may be performed on a mobile application. Turning to FIG. 4A, the user may visit the data broker website/mobile application and may enter an identifier (e.g., email address, phone number, etc.). In one exemplary method, the data broker can initiate a registration process (e.g., a FIDO2 registration process) to register a user device with the data broker. Where a FIDO2 registration process is initiated, the user may be prompted to choose an available authenticator (e.g., a FIDO authenticator) that is accepted for use by the data broker (e.g., a personal identification number, biometric, or the like). For example, FIG. 4B depicts the authenticator to be a facial recognition authenticator. The authenticator can be a platform (or internal) authenticator, a roaming (or external) authenticator, or other suitable types of authenticators.

The platform authenticator can be used to authenticate an entity via a specific device (e.g., via a fingerprint scanner, or other similar components for authenticating the entity via the specific device). An internal authenticator (such as a platform authenticator) may include authentication methods embedded or provided internally on a user device, such as biometrics, a personal identification number, or the like. An external authenticator (such as a roaming or cross-platform authenticator) may include authentication methods across multiple devices but are not tied to any one particular platform or device by delegating some of the trust involved in authentication to an associated platform or device. Examples of such other devices may include other user devices, such as other mobile devices, wearables, or the like. In some examples, the device may include a trusted platform module security chip for handling public keys and private keys for use in authenticating a user device. Additionally, the device may include a camera or biometric reader that supports biometric input to the platform authenticator. The roaming authenticator can include a hardware security key and can be used with a laptop, a mobile device, etc. for being a cross-platform authenticator. An entity can bootstrap (or authorize, as needed) other devices using the roaming authenticator. In some examples (e.g., when a first device is lost, corrupted, or the like), the roaming authenticator can be used to authorize a new device. The user may unlock the authenticator using a fingerprint reader, a button on a second-factor device, securely-entered PIN and/or other suitable passwordless authentication method. Once the user device is registered, the data broker may provide a user account to the user.

The user device may create a new public and private key pair unique for the user device, the data broker, and the user account. As will be discussed further below, these keys can be used in the future to authenticate the identity of the user using the user device. The public key can be transmitted to the data broker who may store the public key as being associated with the user account. The private key and any information about the local authentication method (such as biometric measurements or templates) may not leave the user device.

In some exemplary methods, after the user device and account are registered with the data broker, the user may choose to add the data provider to the user account so that the data broker may be given access to certain user data stored by the data provider. The user may add the data provider to the user account by enrolling the data provider with the data broker. To enroll the data provider, the user device must gain or have access to the user account with the data broker using the public and private keys generated during the creation of the user account when initially registering the user device with the data broker. For example, the user can access the data broker website/mobile application. The data broker may initiate an authentication process (e.g., a FIDO2 authentication process) to authenticate the user device. This may include the data broker issuing a challenge to the user device to login with a previously registered device that was accepted for use by the data broker. The challenge may be a cryptographic request to the user device for a response (e.g., for a signature with the private key locally stored on the user device). Signing the challenge would encrypt the challenge with the private key. This signed challenge may then be decrypted by the public key stored by the data broker to verify that the private key associated with the user device was used to sign the challenge. To access the private key, the user may unlock the authenticator using the same or similar method as described above with respect to the user account registration process noted above (e.g., by using the facial recognition authenticator as shown in FIG. 4B). Once the authenticator is unlocked, the user device may access the private key stored locally on the user device and sign the challenge of the data broker with the private key. The user device can transmit the signed challenge back to the data broker, which may verify the signed challenge with the stored public key (e.g., using the public key to decrypt the challenge encrypted with the private key) and provide access to the user for the registered user account.

Figure 4D:
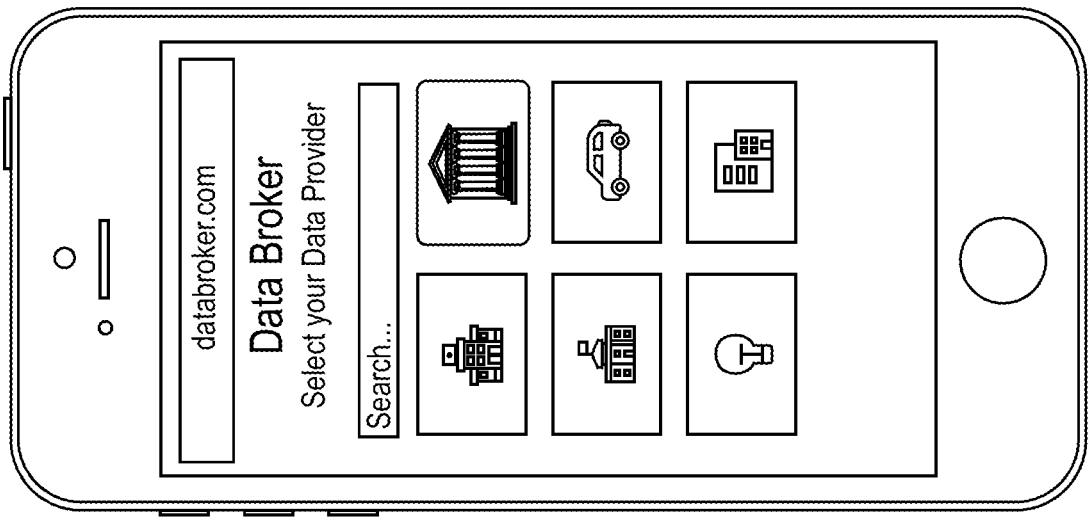
Figure 4C:
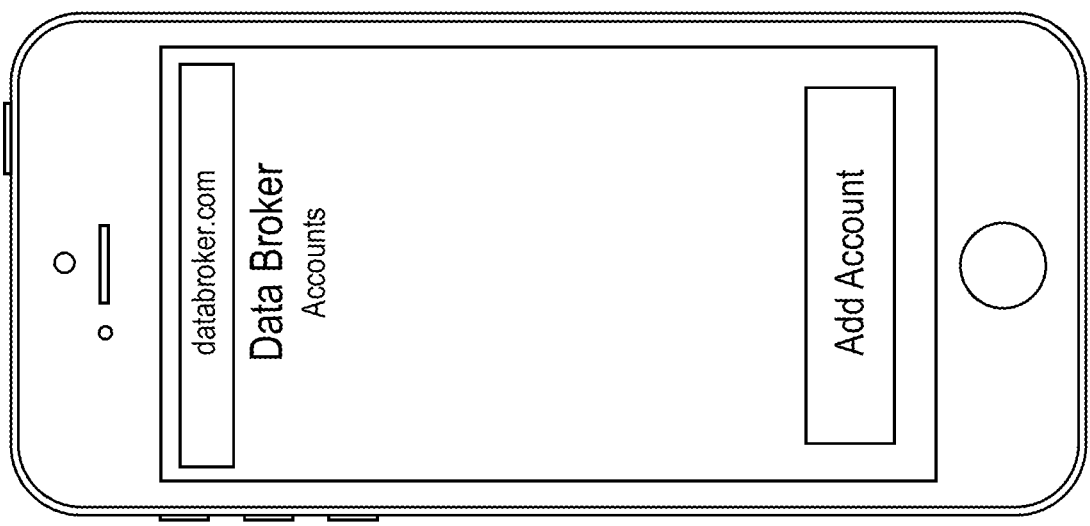

Once the user has access to the registered user account, as shown in FIG. 4C, the user may enter the data provider that the user may desire to add and may select the data provider. In some embodiments, the user may select the desired data provider from a drop-down menu having available data providers, as shown in FIG. 4D. In other embodiments, if the desired data provider is not included in the drop-down menu, the user can add the desired data provider to the list by inputting the desired data provider into a second input field, which may add the desired data provider to the list. In some embodiments, after a user has registered a first device, the user can use any other suitable user devices to enroll a data provider (as long as the other devices are linked to the first device in some way, e.g., via a shared email address/user identifier, and can be identified as an associated user device with the first device).

With the data provider details provided by the user, the data broker may initiate an authorization process to request authority to gain or have access to certain data from a data provider. For example, this may be an OIDC authorization code flow with "offline_access" scope. Offline access scope gives the data broker access to at least a subset of data of the data provider on behalf of the user for a time period by receiving access tokens for that time period (which can be any desirable length of time, such as 6 hours, 30 days, 90 days, etc.). The data broker may use the access tokens to access the data provider data, as described below, for the given period of time. The data broker can get new access tokens as older access tokens expire.

Figure 4F:
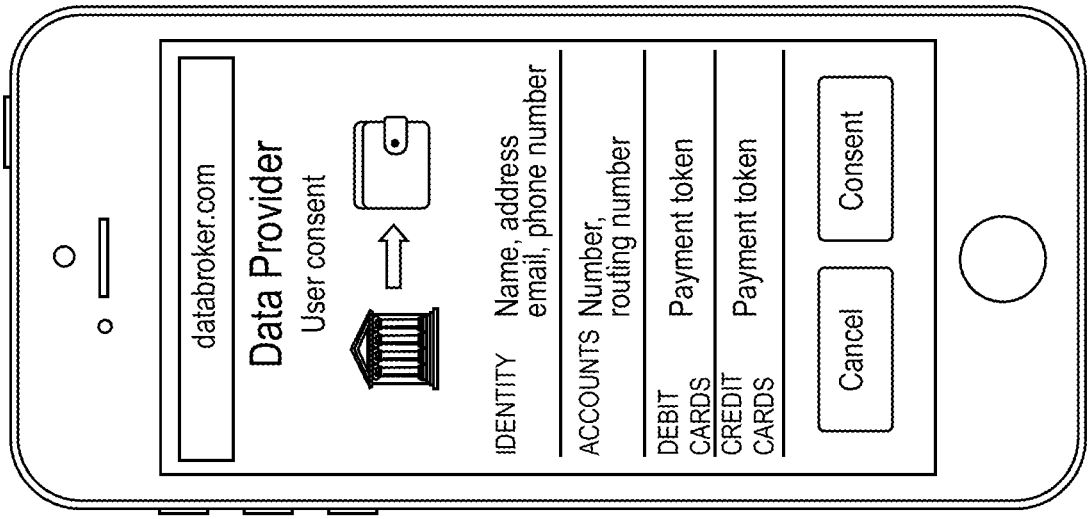
Figure 4E:
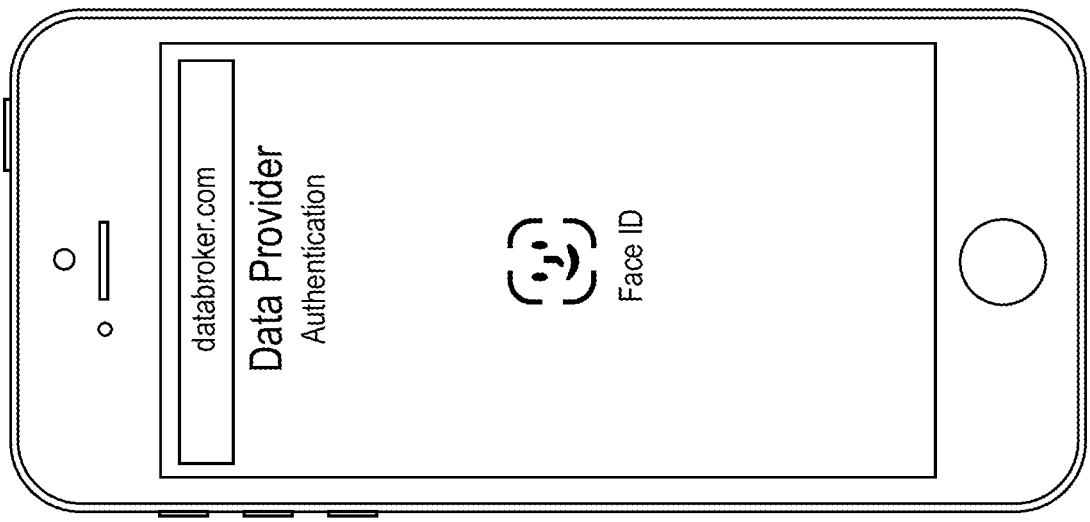
Figure 4G:
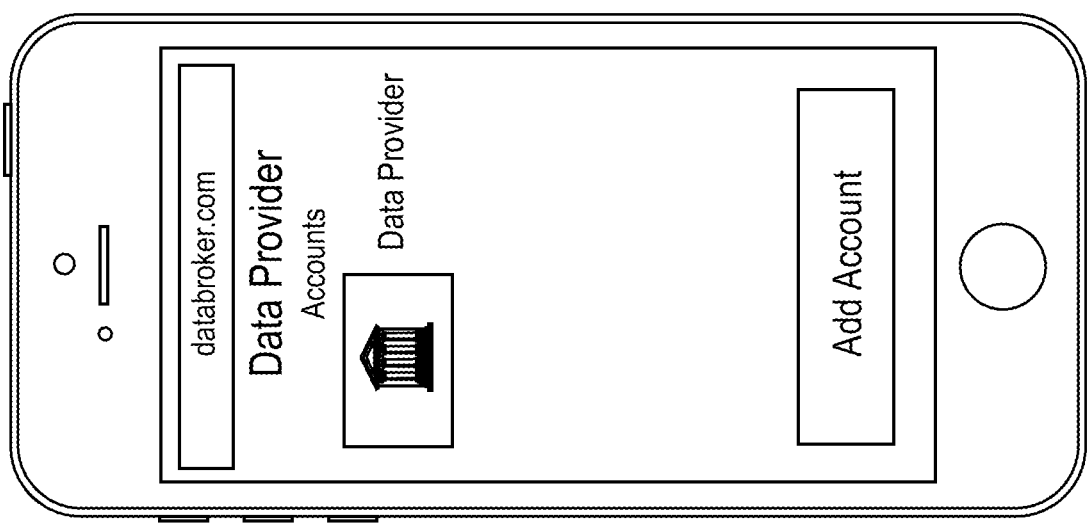

For example, after the user has selected a data provider, the user may be redirected to the data provider website/mobile application. The user may enter user credentials for the data provider to login with the data provider, including also using an authenticator accepted for use by the data provider (e.g., a facial recognition authenticator as shown in FIG. 4E). Turning to FIG. 4F, the data provider website/mobile application may request consent from the user to share at least a subset of the data provider data with the data broker. If the user refuses to consent to the data provider sharing information with the data broker, the data provider may inform the data broker that consent was refused and halt the process. If the user provides consent to the data provider, the data provider may be enrolled with the data broker, as shown in FIG. 4G, and the data provider server may return a first access token (i.e., a data provider access token) to the data broker server that expires after a period of time. The access token may include information regarding what data the data broker may access as well as indicate that the token's holder (i.e., the data broker) is authorized to access that data). This access token may be given by the data provider so that the data broker may, when needed, present that access token to the data provider to access a particular endpoint housing certain data (e.g., user information) within the data provider. Specifically, the access tokens may be presented by the data broker to call a particular endpoint within the data provider (e.g., a portion of the data provider that houses the user information). The data provider may verify that the access token is still valid (e.g., that the access token is not expired) and, once the access token is verified, may provide the data broker access to the endpoint storing that certain data.

In some embodiments the data provider can determine how long this period of time may be. In other embodiments, the data provider access token may expire according to other preferences/policies of the data provider. In other embodiments, the data broker can provide additional security services (such as providing security checks to make sure a user includes authorization from the data provider to provide the requested consent). In many embodiments, if a user wishes to share additional information with the data broker after an access token has been issued to the data broker from the data provider, the original data provider access token may be deleted and a new data provider access token may be issued.

The data broker server may store the data provider access token in a database. In some embodiments, when a data provider ceases to use the data broker (e.g., the data provider terminates its registration with the data broker), the data provider access token may continue to be stored on a database of the data broker until an end of a termination period of the access token (e.g., as determined by the data provider). In other embodiments, when the data provider ceases using the data broker, the data provider access token may not continue to be stored on a database of the data broker (e.g., the data provider access token may be deleted). The data broker website/mobile application may be configured to display at least a subset of the data provider data.

Figure 4I:
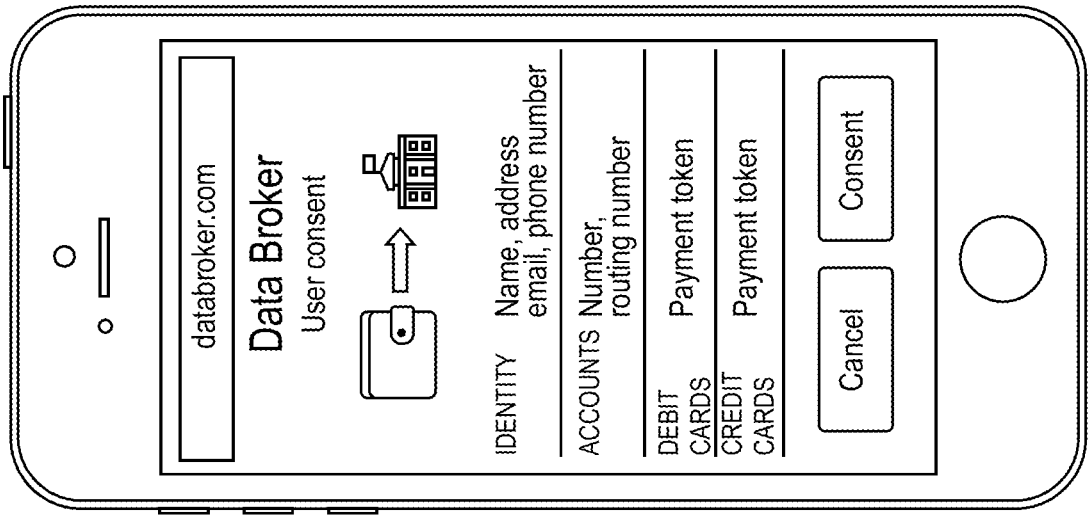
Figure 4H:
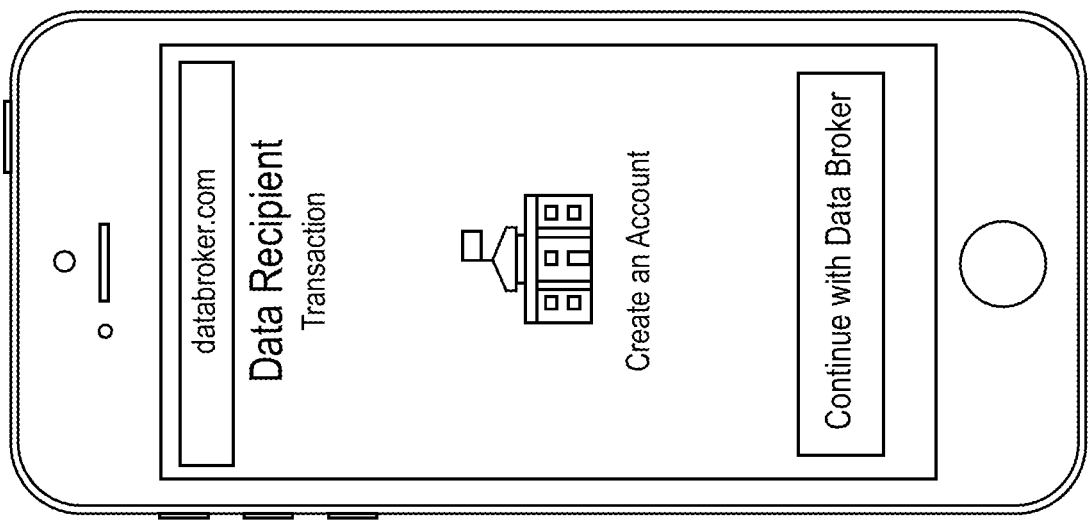

Some exemplary methods may include a transaction with respect to a data recipient. The user may visit a data recipient website/mobile application to create an account with the data recipient, as shown in FIG. 4H. The data recipient may initiate an authorization process (e.g., OIDC authorization code flow with "offline access" scope) to request authority to access certain data via the data broker. The user may be redirected to the data broker website/mobile application. The data broker may initiate an authentication process (e.g., a FIDO2 authentication process). In some embodiments, if a user attempts to access the data broker with a device that has not yet been registered with the data broker, the user can be prompted to register the new device, as described above. If the user device was previously registered, the data broker may challenge the user to authenticate the user device, as described above (e.g., including using a facial recognition authenticator, as shown in FIG. 4B).

The data broker server may identify at least a subset of data provider data of the user that can satisfy the data recipient request. As shown in FIG. 4I, the data broker website/mobile application may request user consent to share at least a subset of the data provider data with data recipient. In some embodiments, the data broker can provide additional security services (such as providing security checks to make sure a data recipient user (or a data provider user) is authentic and includes the proper authorization from the data provider and/or the data recipient to provide the necessary consent). The user may provide the requested consent. The data broker server may return a data broker access token to the data recipient. In some embodiments, the data broker access token may be different than the data provider access token and may expire according to preferences/policies of the data broker.

Figure 4J:
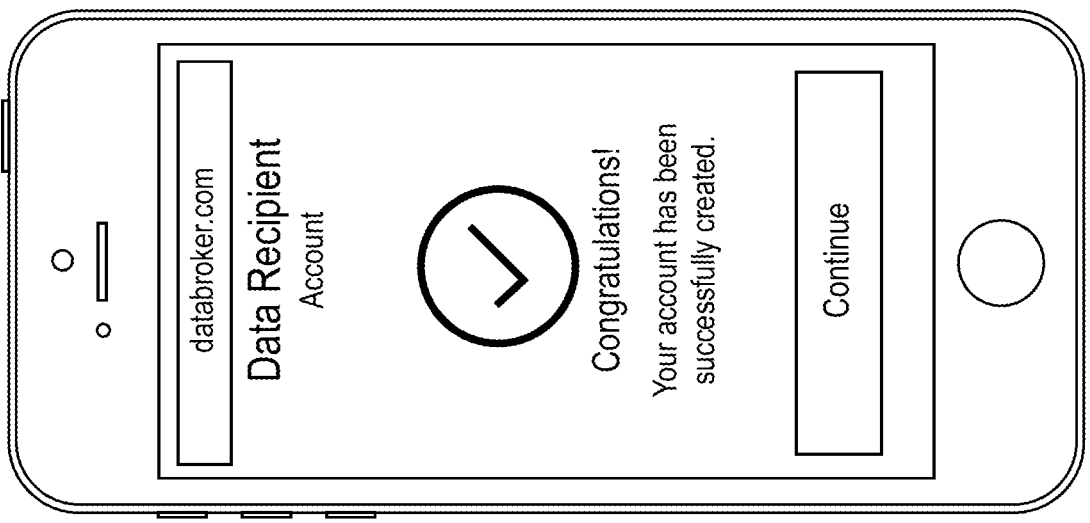

Once the data broker has provided the data broker access token, the data recipient may create an account for the user, as shown in FIG. 4J. The data recipient server may store the data broker access token in a database. In some embodiments, when a data recipient ceases using the data broker (e.g., the data recipient terminates its registration with the data broker) the data broker access token may continue to be stored on a database of the data recipient until the end of the termination period of the access token (e.g., as determined by the data broker). In other embodiments, when a data recipient ceases using the data broker the data broker access token may not continue to be stored on a database of the data recipient (e.g., the data broker access token may be deleted). In many embodiments, the data provider access token and the data recipient access token can be stored on a shared database.

As such, where the user device requests that certain data be transferred from the data provider to the data recipient via the data broker, the data recipient may initiate a first authorization process (e.g., an OIDC flow) to transmit the data broker access token from a data recipient server to a data broker server. Transmitting this data broker access token may signal the data broker to request access for data from the data provider. Accordingly, the data broker may initiate a second subsequent authorization process (e.g., another OIDC flow) and transmit the data provider access token(s) from the data broker server to a data provider server. The data provider may then transmit the requested data to the data broker and then the data broker may transmit the requested data to the data recipient. In some embodiments, a data provider may be provided the option to allow/not allow certain types of data recipients (or specific data recipients) to be given access to data.

In some embodiments, the data provider does not include certain portions of the requested data and, instead, may be in communication with another provider that has additional portions of the data. For example, the data provider may have a first payment information of a user (e.g., a home address and birthdate) but may not have a second payment information (e.g., credit card information). Instead, another provider, such as a token service provider, may have this second payment information. In this example, the token service provider may have received (e.g., via a user interface provided by the data provider to the user device, or via API) payment information associated with the user. In some embodiments, the data provider may enroll the token service provider with the data provider in a similar manner as the data broker enrolling the data provider. The token service provider may then provide a payment token to the data provider.

When the data provider receives the data provider access token and transmits the requested information to the data broker, the data provider may additionally transmit the payment token. The data broker will then transmit both the requested user information and the payment token to the data recipient to complete the transaction.

In one example, the user device may request to make a payment with the data recipient using payment information stored with both the data provider and the token service provider. Using the methods noted above, the data recipient may transmit a data broker access token to the data broker requesting payment information from the data broker. The data broker may transmit a data provider access token to the data provider requesting payment information from the data provider. The data provider may transmit the requested payment information and the payment token to the data broker, who can, in turn, provide the requested payment information and payment token to the data recipient to complete the payment.

In other embodiments, the token service provider may directly provide the payment token to the data broker rather than the data provider (e.g., the user device consented for the token service provider to share the payment token with the data broker). In this example, the user device may enroll the token service provider with the data broker in a similar manner as with the selected data provider, as noted above. The user device may request the user's payment information from the data broker, who may request payment information from the data provider and the payment token from the token service provider. Each provider may then provide their stored payment information to the data broker. The data broker may then provide the requested payment information to the data recipient.

The data provider server may return payment method information (e.g., name, billing address, payment token, etc.) to the data broker server. The data broker server may return at least a subset of the payment method information to the data recipient server. The user may be redirected to the data recipient website/mobile application. The data recipient may execute the payment with the subset of the payment method information received from the data broker and complete the transaction. The data broker website/mobile application may be configured to display the data recipient with respect to the data provider used in the transaction.

Embodiments may include a payment token that may enable a fast and seamless checkout experience for e-commerce purchases or other suitable purchases that may reduce card-not-present fraud and false decline losses. The payment token may enable a service for users to pay online without sharing payment information with entities (e.g., data recipients such as merchants). Transactions that are executed without the payment token may be characterized by a larger risk of identity fraud than transactions that use the payment token. False declines, or transactions that are denied by a data recipient and/or other suitable system and that are detrimental to relationships between the data providers/recipients and users, may be reduced by using the payment token.

Figure 1:
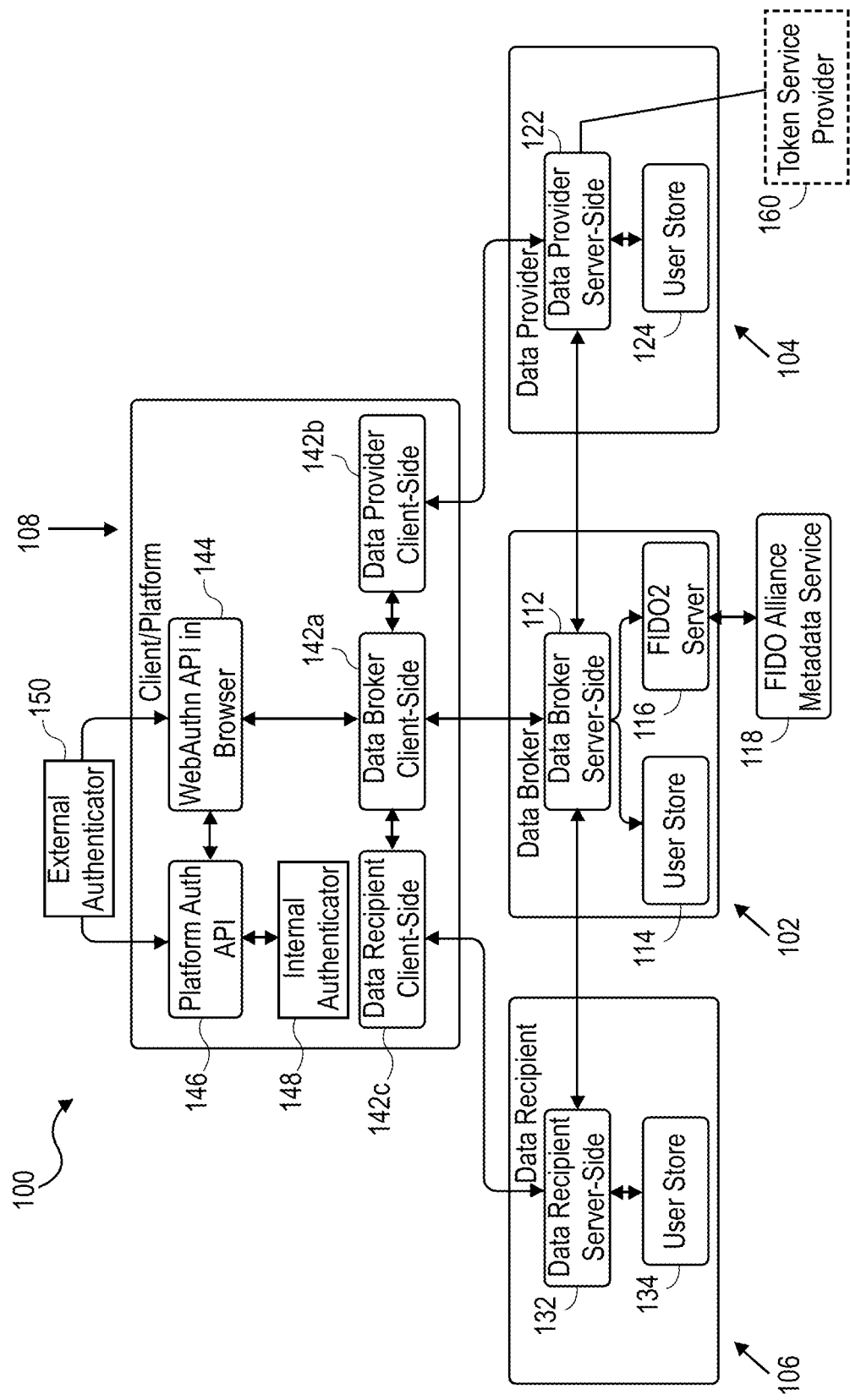
FIG. 1 illustrates a computing environment including a system for facilitating secure and passwordless transfer of data between a data provider and a data recipient according to an embodiment of the present invention.

Turning now to FIG. 1, a computing environment 100 including a system for securely transferring data without passwords is illustrated. The computing environment 100 may include a data broker 102, a data provider 104, a data recipient 106, and a user device 108. The computing environment 100 may include any other suitable computing devices, servers, and/or systems. The data broker 102, the data provider 104, the data recipient 106 and/or the user device 108 may include one or more computing devices, computing systems, and/or servers and may be configured to transmit and/or receive data using, for example, techniques described herein. For example, the data broker 102 may be configured to facilitate secure and passwordless transfer of data between the data provider 104 and the data recipient 106. The data provider 104 and/or the data recipient 106 may include (or may be operated by) one or more financial institutions, one or more government institutions, one or more insurance companies, one or more healthcare providers, or one or more other suitable entities that may transmit and/or receive data. The user device 108 may be or otherwise include a personal computing device or other suitable computing device (e.g., a laptop computer, a tablet computer, a smartphone, or the like) that can allow an entity, such as a consumer or other suitable individual, to request transfer of data via the data broker 102. In some embodiments, the user device 108 can interact or otherwise communicate with one or more of the data broker 102, the data provider 104, and the data recipient 106 via a web browser and/or a mobile application.

The data broker 102 may include a server-side data broker 112, a user store 114, and a FIDO2 server 116. The data broker 102 may include other suitable components and/or modules for facilitating data transfer. The server-side data broker 112 may be, or otherwise include, an application programming interface (API) or other suitable component that can communicate with other computing devices (e.g., the user device 108 and the like). The user store 114 may be, or otherwise include, a database that may store user accounts that may be registered with the data broker 102. For example, a user that may desire to request transfer of data from a data provider 104 to a data 106 recipient may: access (e.g., via the user device 108) the data broker 102, register (e.g., set up) a user account with the data broker 102, and the data broker 102 may store information relating to the user account in the user store 114. The FIDO2 server 116 may be or include a server that can facilitate passwordless authentication. For example, the data broker 102 can execute the FIDO2 server 116 for authenticating a data transfer request received, for example, from the user device 108. In some examples, the data broker 102 may be communicatively coupled to a FIDO alliance metadata service 118 that may provide one or more services to the data broker 102. The services may include authentication services and/or other suitable services for the data broker 102.

The data provider 104 may include a server-side data provider 122 and a user store 124. The data provider 104 may include any other suitable components and/or modules for providing data (e.g., on behalf of a user of the user device 108) for a passwordless and secure data transfer operation. The server-side data provider 122 may be, or otherwise include, an application programming interface (API) or other suitable component that can communicate with other computing devices (e.g., the data broker 102, the user device 108, and the like). The user store 124 may be, or otherwise include, a database that may store user accounts. The user accounts may relate to the user accounts registered, for example, with the data broker 102 (e.g., in the data store 114). In some embodiments, the data provider 104 may optionally be communicatively coupled to (or otherwise in communication with) a token service provider 160, as discussed above.

The data recipient 106 may include a server-side data recipient 132 and a user store 134. The data recipient 106 may include any other suitable components and/or modules for receiving data (e.g., on behalf of a user of the user device 108) for a passwordless and secure data transfer operation. The server-side data recipient 132 may be or otherwise include an application programming interface (API) or other suitable component that can communicate with other computing devices (e.g., the data broker 102, the user device 108, and the like). The user store 134 may be or otherwise include a database that may store user accounts. For example, the user accounts included in the data store 134 may be associated with a user that may be associated with the user accounts included in the data store 114 and/or the user store 124.

The user device 108 may include one or more communication interfaces 142a-c, a first API 144, a second API 146, and a FIDO internal authenticator 148. The user device 108 may include any other suitable components and/or modules for requesting a secure and passwordless data transfer operation. In some embodiments, a user may use the user device 108 to transmit a request to the data broker 102 for data to be transferred, for example, between the data provider 104 and the data recipient 106.

The user device 108 may communicate with the data broker 102, the data provider 104, and/or the data recipient 106 via the communication interfaces 142a-c, respectively. For example, the user device 108 may use the communication interface 142a (e.g., the client-side data broker) to communicate with the data broker 102, the communication interface 142b (e.g., the client-side data provider) to communicate with the data provider 104, and the communication interface 142c (e.g., the client-side data recipient) to communicate with the data recipient 106. In some embodiments, the communication interfaces 142a-c may include one or more APIs configured to communicate (e.g., via one or more API calls) with one or more of the data broker 102, the data provider 104, and the data recipient 106.

The first API 144 and/or the second API 146 may be configured to make one or more API calls to, or otherwise communicate with, one or more authentication servers and/or services for performing authentications. The authentications may include authenticating a request for data transfer or any other suitable request (e.g., login attempts) with respect to the computing environment 100. For example, the first API 144 may make an API call to an external authenticator 150, which may be an external authentication service that can use FIDO standards for authentication requests. In another example, the second API 146 may make an API call to the internal authenticator 148, which may be or otherwise include an authentication application, that can use FIDO standards for authentication requests, stored on and/or executable by the user device 108. In some embodiments, the user device 108 may include only one of the first API 144 or the second API 146 and the internal authenticator 148.

In some embodiments, the user device 108 can be used to initiate a secure and passwordless transfer of data. For example, a user may use the user device 108 to communicate with the data broker 102 to register an account with the data broker 102. Additionally, the user may use the user device 108 to add a data provider 104 to the account registered with the data broker 102. The user can additionally use the user device 108 to access the data recipient 106 and to request that data (e.g., from the data provider 104) be transferred from the data provider 104 to the data recipient 106 via the data broker 102. In some embodiments, authentications (e.g., authenticating the account login, authenticating the data transfer request, etc.) can be performed using the FIDO2 standard or any other suitable passwordless authentication standards. Additionally, the data requests and consent requests/receipts can be performed using the OIDC standard or any other suitable standard in which data is not directly stored on the data broker 102.

Figure 2:
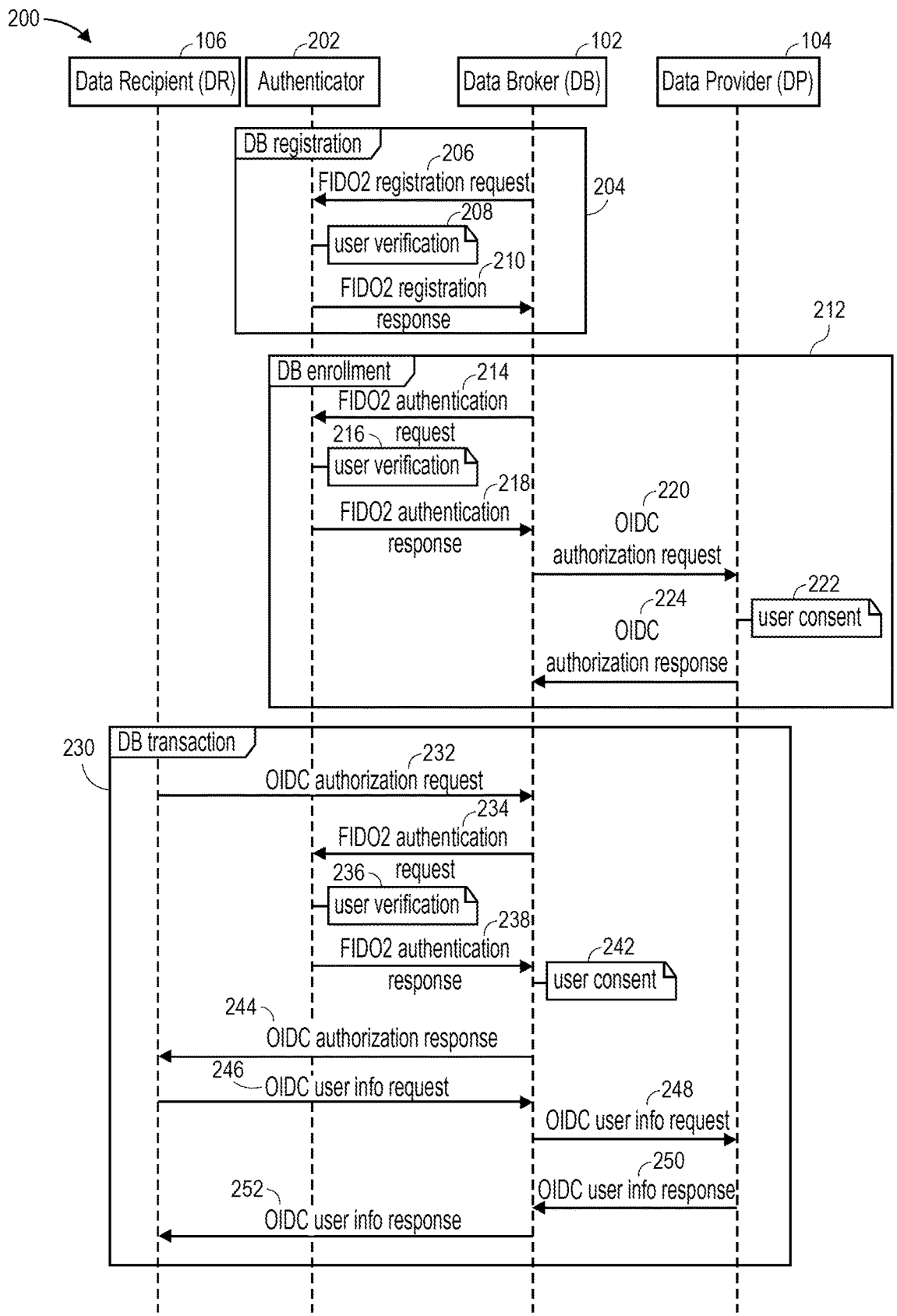
FIG. 2 is a sequence diagram illustrating a process for facilitating secure and passwordless transfer of data between a data provider and a data recipient according to an embodiment of the present invention.

FIG. 2 is a sequence diagram 200 illustrating techniques relating to facilitating secure and passwordless transfer of data between a data provider 104 and a data recipient 106 according to an embodiment of the present invention. In some embodiments, the transfer of data may be initiated or otherwise requested by a user (e.g., via a user device 108). The sequence diagram 200 may involve the data broker 102, the data provider 104, the data recipient 106, and a FIDO authenticator 202, which may be the external authenticator 150 or the internal authenticator 148 on the user device 108. The sequence diagram 200 may involve other suitable computing devices and/or any suitable components thereof. In some embodiments, some or all of the techniques described with respect to the sequence diagram 200 may be performed with respect to the user device 108.

The sequence diagram 200 may begin with a data broker registration 204 by the user device 108 communicating with the data broker 102. A user of the user device 108 may transmit a registration request 206 so that a user account or other suitable account be registered or otherwise set up with respect to the data broker 102. The registration request 206 may be or otherwise include a request to register the user with the data broker 102, for example, for allowing the data broker 102 to perform data transfers on behalf of the user. The registration request 206 may involve a FIDO2 registration process using an authenticator 202 (e.g., a platform authenticator, as discussed above). As discussed above, the user may select a particular authenticator (e.g., one or more of the internal or external authenticators noted above) acceptable by the data broker 102 for user verification 208 to register the user device with the data broker 102. Verifying the user with the authenticator 202 generates a public and private key associated with the user device 108 and data broker 102, as discussed above. As a part of the registration response 210, the user device 108 provides the public key to the data broker 102 to be associated with the user account registered with the data broker 102 for future use in authenticating the user device 108.

The sequence diagram 200 may proceed to a data provider enrollment 212 with the data broker 102. The data provider enrollment 212 may involve the user adding a data provider 104 (or providing the data broker 102 access to a data provider 104) to the user account registered with the data broker registration 204. The user device 108 may transmit a request to the data broker 102 to add the data provider 104 to the user account. The data broker 102 may transmit an authentication request 214 (e.g., a FIDO2 authentication request) to the authenticator 202 in the form of a challenge requesting a response (e.g., for a signature with the private key generated by the user device 108 when the account with the data broker 102 was first created). Accessing the private key requires user verification 216. In particular, the user device 108 may unlock the authenticator using a same or similar method as used during the registration (i.e., choosing a particular authenticator to verify the user device 108, such as biometrics or the like). Once the user device 108 unlocks the authenticator 202, the user device 108 may access the private key to sign the challenge with. The user device 108 may send the signed challenge back to the data broker 102 in an authentication response 218 for the data broker 102 to verify with the public key stored by the data broker 102. Once the data broker 102 has verified the signed challenge and provided access to the user account for the user, the user device 108 may provide the data broker 102 with information regarding a data provider 104 that the user wishes to associate with the user account registered with the data broker 102. In some embodiments, this may include the user device 108 selecting a data provider 104 from a list of data providers 104 provided by the data broker 102. The selected data provider 104 may be a data provider 104 that the user has a relationship with (e.g., a user's personal bank).

After a data provider 104 is selected by the user device 108, the data broker 102 may transmit an authorization request 220 (e.g., an OIDC authorization request) to the data provider 104. The OIDC authorization request 220 may include a request to access data on behalf of the user. In some embodiments, transmitting the authorization request 220 can involve the user device 108 requesting the authorization request 220 be sent to the data provider 104. The data provider 104 may receive the authorization request 220 and may request a user consent 222 from the user device 108. In requesting consent, the data broker 102 may provide a user interface to the user device 108. The user interface may present a webpage (e.g., of the data provider 104) or other suitable information relating to the data provider 104. The user interface may allow the user (e.g., via the user device 108) to provide input for the user consent 222. For example, the input provided by the user may include a signature, a digital key, and/or other suitable input for the user consent 222. Providing the user consent 222 may indicate an agreement from the user for disclosing data relating to the user and included or otherwise operated by the data provider 104. If the user device 108 refuses to consent to the data provider 104 sharing information with the data broker 102, the data provider 104 may inform the data broker 102 that consent was refused and halt the process. In response to receiving the user consent 222, the data provider 104 may transmit an authorization response 224 (e.g., an OIDC authorization response) to the data broker 102. The authorization response 224 may include a first access token generated by the data provider 104 and for accessing the requested data. The data broker 102 can receive and store the first access token. In some embodiments, the data broker 102 does not store data relating to the user. This may be more beneficial than the data broker 102 receiving and storing data relating to the user as this limits the number of entities housing the user data, thus limiting the chances that the user data can be inadvertently accessed by unwelcome or unauthorized parties. By receiving the authorization response 224, the data broker 102 may add or otherwise associate the data provider 104 with the user account.

At a later time, the user device 108 may request that data be transferred from the data provider 104 to the data recipient 106 in a data recipient transaction 230. For example, the user device 108 may access the data recipient 106 (e.g., via a public website) and may request that the data recipient 106 receive data from the data provider 104 via the data broker 102. In other embodiments, the user device 108 may access other suitable computing devices and/or transmit other suitable requests for transferring the data.

The data recipient transaction 230 may begin with the data recipient 106 sending an authorization request 232 (e.g., an OIDC authorization request) to the data broker 102 requesting authorization to access certain data from selected data provider 104. The data broker 102 may receive the authorization request 232 and may initiate an authorization process (e.g., a FIDO2 authorization process), as discussed above. In particular, the data broker 102 may issue a challenge to the user device 108 in an authentication request 234 (e.g., a FIDO2 authentication request) to the authenticator 202. As discussed above, the user may provide authentication information for user verification 236 to unlock the authenticator and access the private key (e.g., by providing a passwordless authentication to an authenticator). The user device 108 may sign the challenge with the access key and send the signed challenge back to the data broker 102 in an authentication response 238 (e.g., a FIDO2 authentication response).

Once the data broker 102 has verified signed challenge with the stored public key, the data broker 102 may send a consent request to the user device 108 to share data with the data recipient 106. The user (e.g., via the user device 108) may provide the user consent 240 via a digital signature and/or other suitable consent information that indicate an agreement of the user to transfer requested data. The data broker 102, in response to receiving the user consent 240 may generate a second access token (which may be different than the first access token) for accessing the requested data. The data broker 102 may transmit the second access token (e.g., via an authorization response 244, such as an OIDC authorization response) to the data recipient 106. In some embodiments, the data recipient 106 may receive and store the second access token for subsequently accessing requested data.

The data recipient 106 may transmit a user information request 246 to the data broker 102 (e.g., where the user device 108 requests that certain data be provided to the data recipient 106 from the data broker 102). In some embodiments, the user information request 246 may involve a request for data (e.g., requested by the user via the user device 108) from the data provider 104. The data recipient 106 may include the second access token in the user information request 246. The data broker 102 may receive the user information request 246 including the second access token. In some embodiments, the data broker 102 may verify the validity of the second access token to ensure that the data recipient 106 still has authority to access the user data. In response to receiving the user information request 246 (and, for example, validating the second access token), the data broker 102 may transmit a user information request 248 (e.g., an OIDC user information request) to the data provider 104. The OIDC user information request 248 may include the first access token and a request for the requested user data. In response to receiving the first access token, the data provider 104 may transmit the requested user data (e.g., via a user information response 250, such as an OIDC user information response) to the data broker 102. The data broker 102 may verify that the validity of the first access token to ensure that the data broker 102 still has access to the user data. The data broker 102 may then transmit the requested user data (e.g., via a user information response 252, such as an OIDC user information response) to the data recipient 106.

In some embodiments, the data provider 104 may not have all of the requested data. Instead, the data provider 104 may be in communication with a token service provider 160 that has the additional data. In this example, the token service provider may provide the data provider 104 with a payment token (e.g., after being enrolled with at least one of the data provider 104 or data broker 102 in an enrollment process similar to that of enrolling the selected data provider 104 with the data broker 102, as noted above). When the data provider 104 receives the first token, the data provider 104 may provide the requested user information as well as the payment token to the data broker 102 who may then provide the information and payment token to the data recipient 106. The payment token may be used (e.g., by the data recipient 106 and/or other suitable entities or computing devices) to process payment on behalf of the user.

In some embodiments, the first access token and the second access token may be different but may be used to access the same or similar data. For example, the first access token may be used by the data broker 102 to access data from the data provider 104, and the second access token, received from the data recipient 106, may be used by the data broker 102 to provide the accessed data to the data recipient 106. In some embodiments, the data broker 102 does not store any accessed data, and, instead, the data broker 102 accesses and transmits requested data (e.g., using one or more access tokens) in real-time and without storing or otherwise assuming ownership of the requested data. For example, the data broker 102 may transmit the requested data from the data provider 104 to the data recipient 106, and each transfer of data involves an explicit consent (e.g., the user consent 222 and the user consent 242) prior to each transfer of data (e.g., the data broker 102 may not sell or otherwise disclose data without prior explicit consent).

Figure 3:
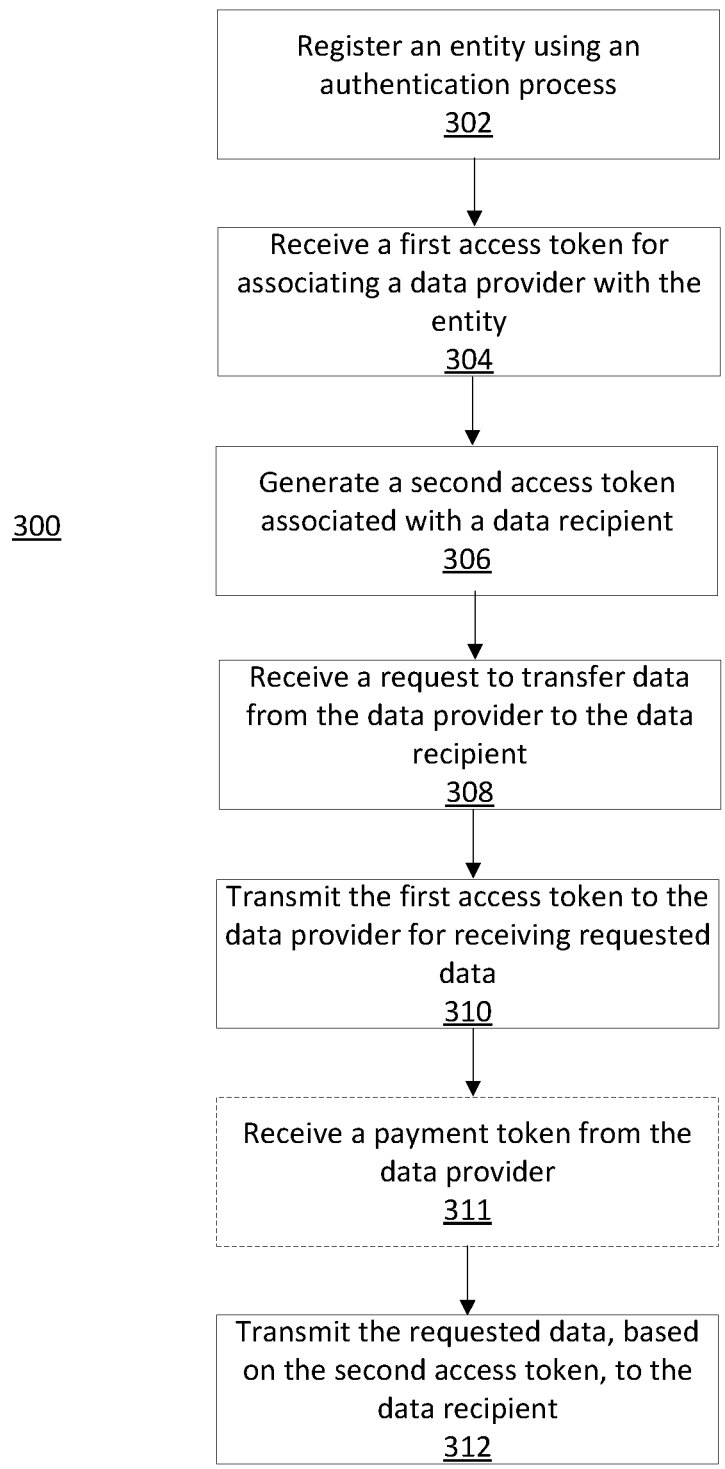
FIG. 3 is a flowchart illustrating a process for facilitating secure and passwordless transfer of data between a data provider and a data recipient according to an embodiment of the present invention.

FIG. 3 is a flowchart illustrating one embodiment of a secure and passwordless data transfer process 300 in accordance with the present invention. The process 300 may be performed by the data broker 102. In some embodiments, the data broker 102 may use or otherwise perform the process 300 for transferring data between a data provider 104 and a data recipient 106 on behalf of a user (e.g., a user of the user device 108). The process 300 may begin at operation 302 by the data broker 102 registering an entity using an authentication process with an authenticator (e.g., a FIDO authenticator). The entity may be or otherwise include the user of the user device 108. In some embodiments, the user, via the user device 108, may communicate with the data broker 102 and may indicate that the user may desire to set up a user account with the data broker 102. The data broker 102 may generate the user account once the user device has been verified with an authenticator accepted by the data broker 102 (e.g., according to an acceptance policy of the data broker 102). The user verification may include various information and/or passwordless authentication factors (e.g., through biometrics, a personal identification number, or the like). Registering the entity with the data broker 102 may generate a private key stored by the entity, and a public key transmitted to the data broker 102 that is associated with the entity and user account registered with the data broker 102.

At operation 304, the data broker 102 associates a data provider 104 with the entity. In some embodiments, the data broker 102 can associate the data provider 104 with the registered user account. For example, the data broker 102 may first performing an authentication process to verify the entity using a similar means of authentication as during the registration process (e.g., with a FIDO2 authenticator). Once verified, the entity may select a data provider 104 to enroll with the data broker 102. Once selected, the entity may be redirected to the data provider 104 website/mobile application to login with the data provider 104. The data provider 104 may request consent to share user data with the data broker 102. Once the entity has provided consent, the data provider 104 may provide a first access token to the data broker 102. The data broker 102 may store the first access token. In some embodiments, the data broker 102 may store the first access token in, or otherwise associate the first access token with, the registered account of the entity. The data broker 102 may not receive entity data in response to the OIDC authorization process with the data provider 104.

At operation 306, the data broker 102 generates a second access token that is associated with the data recipient 106. The data broker 102 may receive a request for authorization (e.g., for OIDC authorization) from the data recipient 106. In some embodiments, the entity (e.g., the user device 108) may initiate the authorization request via the data recipient 106. Upon authenticating the entity (e.g., through a FIDO2 authentication), and upon receiving consent from the entity for the data broker 102 to share data with the data recipient 106, the data broker 102 may generate the second access token. In some embodiments, the data broker 102 may transmit the second access token to the data recipient 106 for storage and/or subsequent use.

At operation 308, the data broker 102 receives a request to transfer data from the data provider 104 to the data recipient 106. In some embodiments, the data broker 102 may provide (e.g., via the user device 108) one or more options of data that the entity or user may select to transfer from the data provider 104 to the data recipient 106. For example, if the data provider 104 is a financial institution, the data broker 102 may provide selectable categories (e.g., account information, asset information, debt information, credit information, or other suitable and/or related information) of data to the entity (e.g., via the user device 108). The data broker 102 may receive a selection of data to transfer and may initiate a user information request process (e.g., an OIDC user information request process).

In some embodiments, the entity may request the data recipient 106 to access user data from the data provider 104. The data recipient may then provide the data broker 102 the second access token in requesting the user data from the data broker 102. The second access token may be different than the first access token but may be used for accessing the same or similar data as the first access token. In some embodiments, the data broker 102 may validate the second access token or otherwise determine that the second access token is associated with and can provide access to the requested data.

At operation 310, the data broker 102 transmits the first access token to the data provider 104 for accessing the requested data. For example, the data broker 102 may transmit the first access token in response to receiving the second access token. In some embodiments, the data broker 102 may initiate the user information request process by transmitting the first access token to the data provider 104. The data broker 102 may additionally transmit a request for certain data from the data provider 104. For example, the certain data may be included in one or more of the selected categories indicated by the entity. In response, the data broker 102 may receive the requested data from the data provider 104. In some embodiments, the data broker 102 may not store or otherwise associate the requested data with the registered entity account, and, instead, may proceed to operation 312 in real-time.

At the operation 312, the data broker 102 transmits the requested data to the data recipient 106. The data broker 102 may transmit (e.g., via an OIDC user information response) the requested data to the data recipient 106. In some embodiments, the data broker 102 may transmit the requested data without storing or otherwise disclosing the requested data without receiving consent from the entity.

In some embodiments, optional operation 311 may be performed. The operation 311 may involve receiving a payment token from the data provider 104. The payment token may be generated by the data provider 104 using a token service provider 160 that may receive payment information from the entity and may, for example, use the payment information to generate the payment token.

Figure 5:
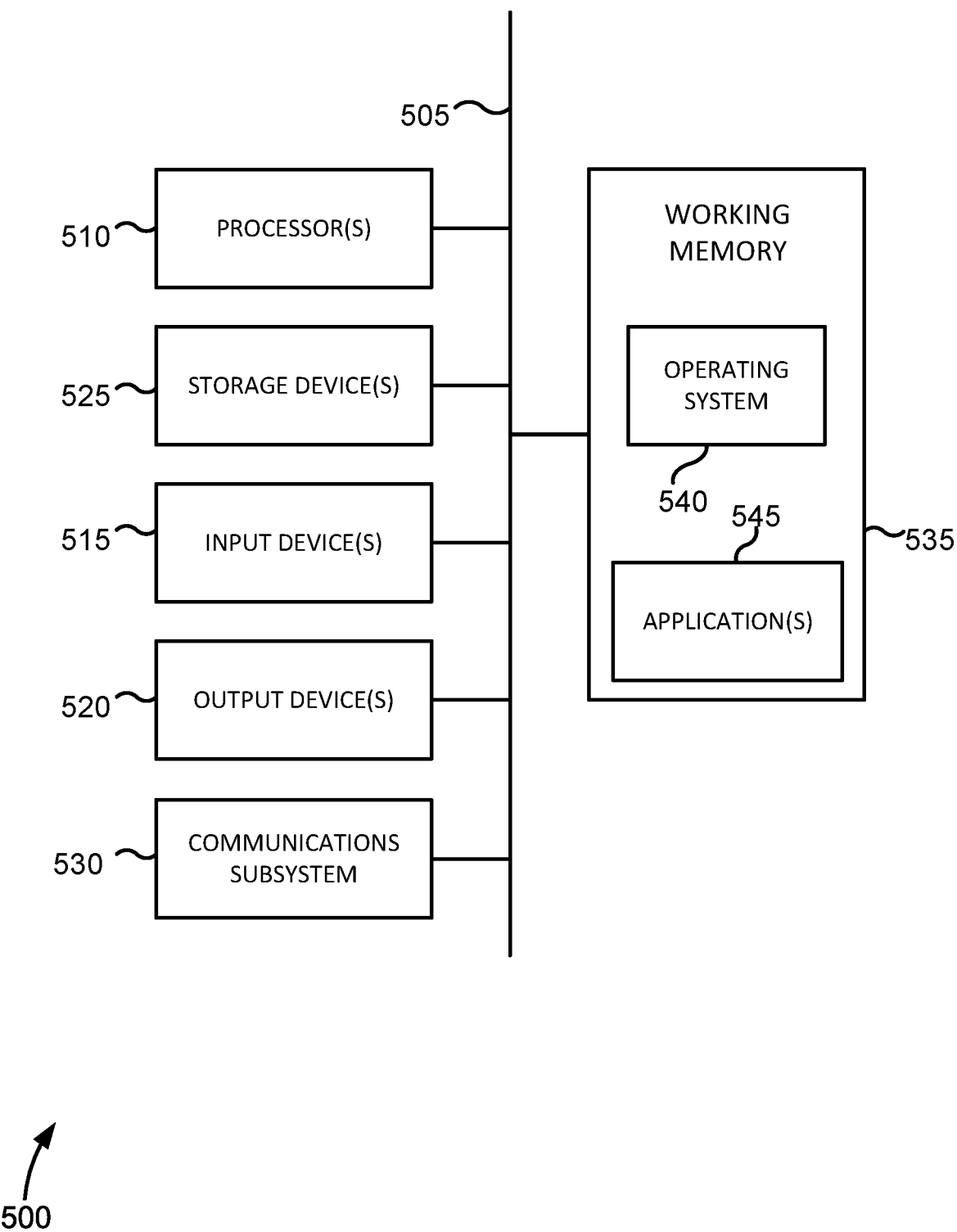
FIG. 5 is a block diagram of a computing system according to an embodiment of the present invention.

A computer system as illustrated in FIG. 5 may be incorporated as part of the previously described computerized devices. For example, computer system 500 can represent some of the components of computing devices, such as the data broker 102, the data provider 104, the data recipient 106, the user device 108, and/or other computing devices described herein. FIG. 5 provides a schematic illustration of one embodiment of a computer system 500 that can perform the methods provided by various other embodiments, as described herein. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more processors, such as one or more central processing units (CPUs), graphical processing units (GPUs), special-purpose processors (such as digital signal processing chips, graphics acceleration processors, and/or the like); one or more input devices 515, which can include without limitation a keyboard, a touchscreen, receiver, a motion sensor, a camera, a smartcard reader, a contactless media reader, a fingerprint scanner, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 430 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a data broker configured to provide some or all of the features described herein relating to the secure and passwordless transfer of data can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire, and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processing unit 510.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of securely transferring data without passwords, the method comprising, using a data broker:
   registering an entity using a fast identity online (FIDO) authentication process;
   associating, based on a receipt of a first access token generated by a data provider, the data provider with the entity;
   generating a second access token, using a first OpenID connect (OIDC) authorization process, associated with a data recipient;
   receiving a request to transfer a requested data set from the data provider to the data recipient, wherein the request includes the second access token;
   transmitting the first access token to the data provider for receiving the requested data set from the data provider; and
   transmitting the requested data set to the data recipient.

2. The method of claim 1, wherein the first access token is generated by the data provider via a second OIDC authorization process.

3. The method of claim 2, wherein:
   the second OIDC authorization process comprises the data provider receiving a first consent to disclose data from the data provider to the data broker from the entity;
   the first OIDC authorization process comprises the data broker receiving a second consent to disclose data from the data broker to the data recipient from the entity; and
   the first consent and the second consent are distinct.

4. The method of claim 2, wherein the first OIDC authorization process and the second OIDC authorization process comprise one or more FIDO2 authentication processes.

5. The method of claim 1, wherein the first access token and the second access token are different.

6. The method of claim 1, further comprising receiving a payment token from the data provider, the payment token usable for processing payment on behalf of the entity.

7. The method of claim 6, wherein transmitting the requested data set to the data recipient includes transmitting the payment token to the data recipient.

8. The method of claim 1, wherein receiving the request to transfer data includes providing a set of selectable categories of data to the entity.

9. The method of claim 8, wherein receiving the request to transfer data includes receiving an indication that at least one category of data of the selectable categories of data was selected by the entity.

10. The method of claim 1, further comprising receiving the requested data set from the data provider in response to transmitting the first access token.

11. A system for sharing digital identity data, comprising:
    one or more processors; and
    a memory having stored thereon instructions that, upon execution by the one or more processors, cause the one or more processors to:
    register an entity using a fast identity online (FIDO) authentication process;
    associate, based on a receipt of a first access token generated by a data provider, the data provider with the entity;
    generate a second access token, using a first OpenID connect (OIDC) authorization process, associated with a data recipient;
    receive a request to transfer a requested data set from the data provider to the data recipient, wherein the request includes the second access token;
    transmit the first access token to the data provider for receiving the requested data set from the data provider; and
    transmit the requested data set to the data recipient.

12. The system of claim 11, wherein the first access token is generated by the data provider via a second OIDC authorization process.

13. The system of claim 12, wherein:
    the second OIDC authorization process comprises the data provider receiving a first consent, from the entity, to disclose data from the data provider;
    the first OIDC authorization process comprises a data broker receiving a second consent, from the entity, to disclose data from the data broker; and
    the first consent and the second consent are distinct.

14. The system of claim 12, wherein the first OIDC authorization process and the second OIDC authorization process comprise one or more FIDO2 authentication processes.

15. The system of claim 11, wherein the first access token and the second access token are different.

16. The system of claim 11, further comprising receiving a payment token from the data provider, the payment token usable for processing payment on behalf of the entity.

17. The system of claim 16, wherein transmitting the requested data set to the data recipient includes transmitting the payment token to the data recipient.

18. The system of claim 11, wherein receiving the request to transfer data includes providing a set of selectable categories of data to the entity.

19. The system of claim 18, wherein receiving the request to transfer data includes receiving an indication that at least one category of data of the selectable categories of data was selected by the entity.

20. The system of claim 11, further comprising receiving the requested data set from the data provider in response to transmitting the first access token.

* * * * *